Aug. 12, 1969  A. C. DYER, JR  3,460,640
SCALE RECORD PAPER TAKE-UP MECHANISM
Filed Feb. 9, 1967  3 Sheets-Sheet 1

INVENTOR.
ALVIN C. DYER, JR.
BY
Baldwin, Doran & Egan
ATTORNEYS.

INVENTOR.
ALVIN C. DYER, JR.
BY
Baldwin, Doran & Egan
ATTORNEYS.

Aug. 12, 1969  A. C. DYER, JR  3,460,640
SCALE RECORD PAPER TAKE-UP MECHANISM
Filed Feb. 9, 1967  3 Sheets-Sheet 3
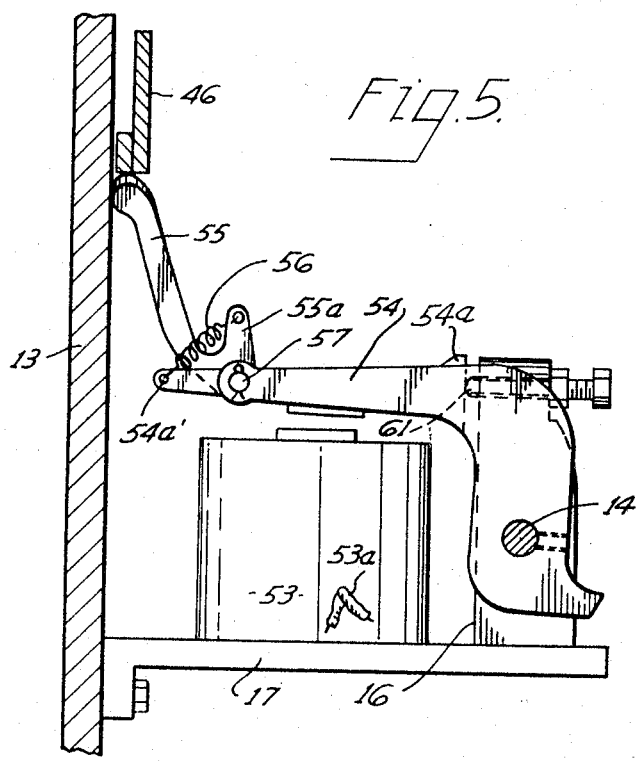
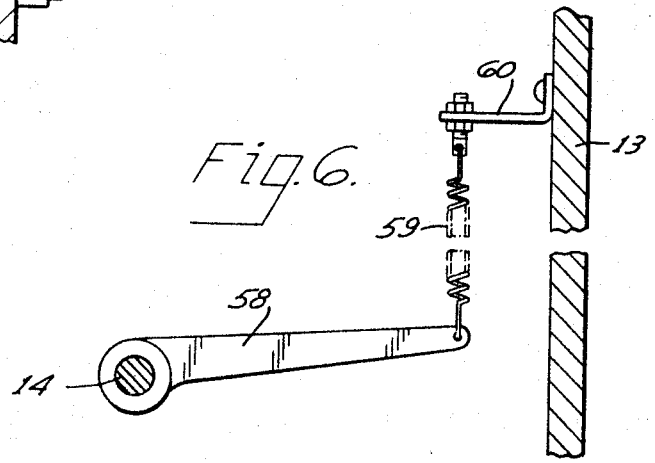
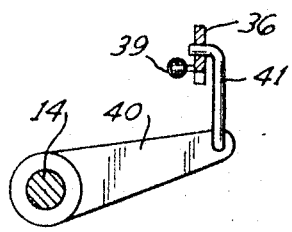
INVENTOR.
ALVIN C. DYER, JR
BY
Baldwin, Doran & Egan
ATTORNEYS.

United States Patent Office 3,460,640
Patented Aug. 12, 1969

3,460,640
SCALE RECORD PAPER TAKE-UP MECHANISM
Alvin C. Dyer, Jr., Novelty, Ohio, assignor to The Atlas
Bolt & Screw Company, Cleveland, Ohio, a corporation
of Ohio
Filed Feb. 9, 1967, Ser. No. 614,942
Int. Cl. G01g 23/38
U.S. Cl. 177—9                                                     1 Claim

ABSTRACT OF THE DISCLOSURE

A weighing scale provided with a continuous length of tape on which weights are sequentially recorded is provided with a take-up reel for the printed tape which is actuated in a take-up direction by means of a falling weight which is reset for each printing operation.

---

In a recording scale where weights are successively recorded on a continuous length of tape, a problem occurs in winding the printed tape on a take-up reel because the take-up stroke varies as more and more tape is wound on the reel requiring a slightly different length stroke at each operation. This problem is attacked in the present invention by providing a falling weight which drives the take-up reel in tape winding direction after each item is printed on the tape and thereafter the weight is replaced ready for the next take-up operation.

This is an object of the present invention and other objects and novel structures for carrying out the present invention will be apparent from the accompanying drawings and description and the essential features thereof will be set forth in the appended claims.

In the drawings—

FIGS. 2 through 7 are sectional views taken along similarly numbered lines of FIG. 1.

Figure 1:
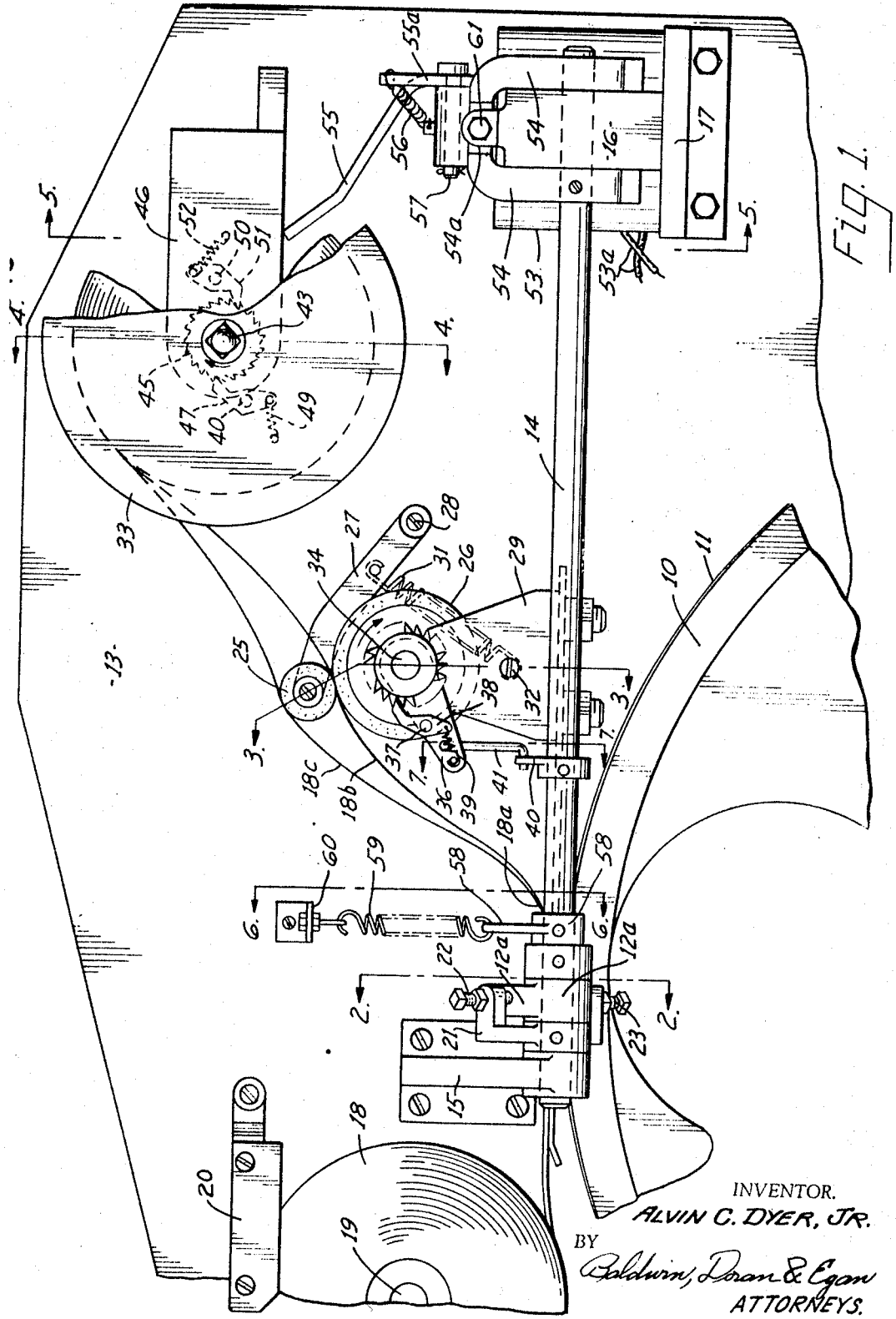
FIG. 1 is an elevational view of one embodiment of this invention.
Figure 2:
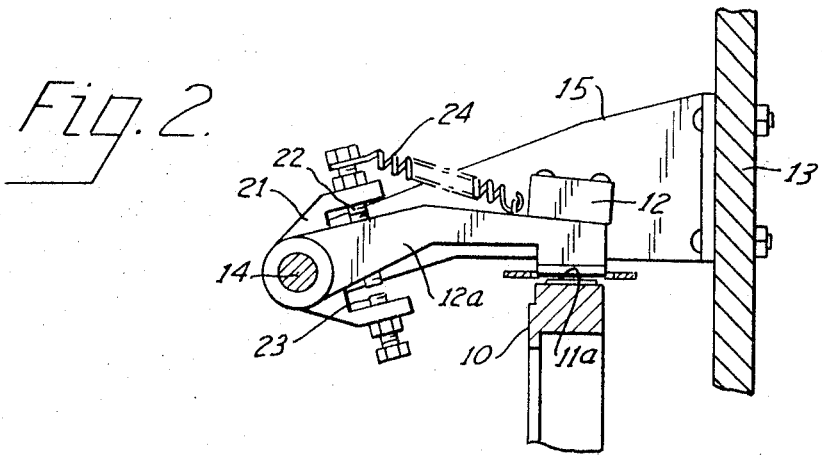

While this invention might be applied to any scale adapted to make a record on a continuous length of tape, it is particularly adapted to be used in combination with a scale like that shown in United States Patent No. 3,167,139, granted Jan. 26, 1965 to E. W. Schellentrager. The ring 10 of the present application, shown in FIG. 1, is intended to be in the position of the wheel 91 mentioned in the above Schellentrager patent. Radially outward at 11, the type extend for use in making the record of the present invention. It should be understood by those skilled in this art that when the dial hand of the weighing scale comes to rest indicating the weight on the scale, then the printing head 12 of this invention is immediately opposite a number 11a (FIG. 2) on the type ring which indicates that same weight and which is to be recorded on the tape of this invention.

Referring to the drawings attached hereto, all parts are shown mounted on a base plate 13. An operating shaft 14 is rotatably mounted in a bearing bracket 15 at the left-hand end of FIG. 1 and in a bearing bracket 16 at the other end which is upstanding from a base bracket 17 which in turn is secured to the base plate 13 as clearly shown in FIG. 5.

A blank roll of tape 18 is supported on the spindle 19 which in turn is attached to the base plate 13. Preferably, a brake 20 puts a drag on the roll of tape 18 so that it will not unwind too freely. The tape then passes under the printing head 12 which is mounted on arm 12a which is freely oscillatable on the shaft 14 but limited in movement by the yoke 21 which is pinned to shaft 14 and carries upper adjustable stop 22 and lower adjustable stop 23. Spring 24 held between stop 22 and the arm 12a normally hold the printing head 12 clear of the type 11a as the scale wheel 10 revolves.

Figure 3:
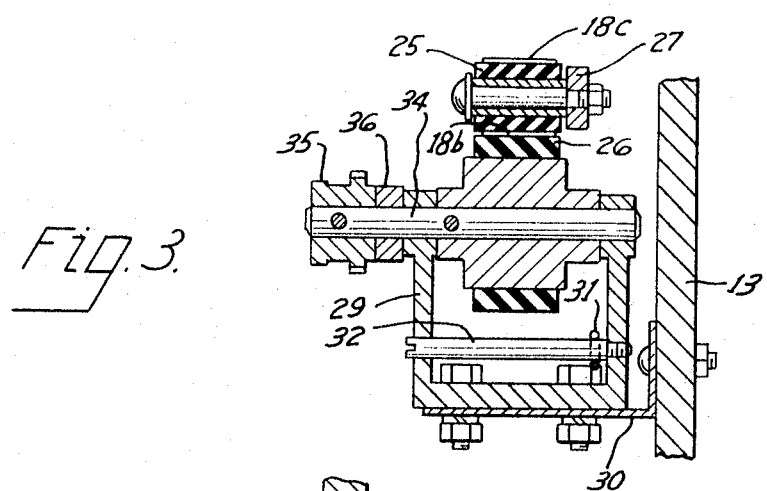
Figure 4:
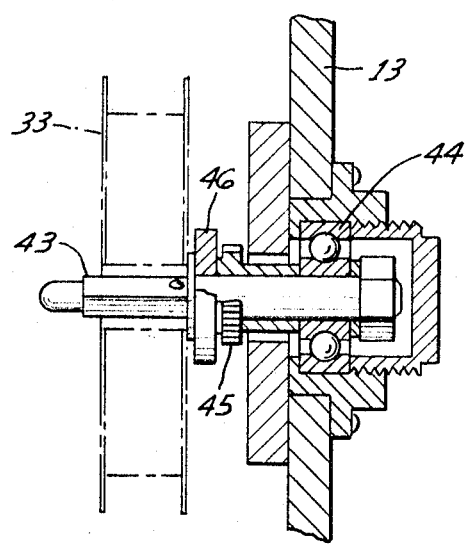

After leaving the printing head 12, the printed tape 18a passes between rubber covered tape feed rolls 25 and 26. Roll 25 is rotatably mounted at the free end of an arm 27 which is pivotally mounted at 28 on the base plate 13. Roll 26 is pivotally mounted in a bracket 29 which in turn is supported by bracket 30 on the base plate 13 as seen in FIG. 3. A spring 31 connected between arm 27 and a pin 32 in bracket 29 urges roll 25 resiliently against roll 26.

While the entire tape 18a might pass between the rolls 25 and 26, the embodiment here shown utilizes a two layer tape of which the lower layer 18b is carbon coated so as to make a record against the upper layer 18c under the influence of the printing head 12. In this case, it is preferred to pass the layer 18b between the feed rolls while the layer 18c passes over the feed roll 25 so that the printing will not be smudged. Thereafter, the two layers again are assembled together to be wound on the take-up reel 33.

Referring to FIG. 3, roll 26 fixed on shaft 34 is provided with intermittent drive means. This comprises a ratchet wheel 35 pinned to shaft 34 and a ratchet lever 36 rotatably mounted on shaft 34 and carrying a pin 37 on which is oscillatably mounted a ratchet pawl 38. A tension spring 39 maintains the ratchet pawl in the teeth of the ratchet wheel. The arrangement is such that movement of lever 36 in a clockwise direction about shaft 34 as viewed in FIG. 1 causes drive roll 26 to move in the direction of the arrow, whereas movement of lever 36 in a counterclockwise direction moves the pawl 38 idly over the ratchet wheel teeth. An arm 40, pinned to shaft 14, is drivingly connected with ratchet lever 36 by connecting rod 41 as clearly shown in FIGS. 1 and 7.

Take-up reel 33 is non-rotatably mounted on the squared end of shaft 43, which shaft is freely rotatable in a friction reducing bearing 44 mounted on the base plate 13. Ratchet wheel 45 is fixed on shaft 43. Weighted arm 46 is freely oscillatable on a cylindrical portion of shaft 43. The ratchet wheel 45 turns clockwise in the direction of the arrow of FIG. 1 and is prevented from turning in the opposite direction by ratchet pawl 47 which oscillates about a fixed pivot 48 and is held against the ratchet wheel by spring 49. Movement of ratchet wheel 45 and shaft 43 together with take-up reel 33, as viewed in FIG. 1, is caused by clockwise falling movement of the weighted arm 46 which carries a pin 50 on which is pivotally mounted a ratchet drive pawl 51 held in the ratchet teeth by means of spring 52. It is obvious that movement of the weight 46 upwardly by oscillation counterclockwise will cause the ratchet pawl 51 to move idly over the ratchet wheel 45 while ratchet pawl 47 prevents movement of the ratchet wheel opposite the arrow. Later, when weight 46 falls downwardly by clockwise movement about the shaft 43, then pawl 51 drives the ratchet wheel in the direction of the arrow of FIG. 1 while pawl 47 moves idly over the ratchet teeth.

Power means is provided for operating the printing head 12, the tape feed rollers 25 and 26, and the take-up reel or drum 33. In this embodiment, such power means comprises an electrical solenoid 53 mounted on the bracket 17. The armature attracted by this solenoid comprises an L-shape bracket 54 fixedly mounted on the shaft 14. It will be noted in FIG. 1 that the vertical portion of the bracket 54 is bifurcated and straddles the upstanding member 16 which provides a bearing for the shaft 14. Pivotally mounted near the free horizontal end of this L-shape lever 55 downwardly so as to permit falling action of the ing the weight upwardly. The free end of this lever lies beneath weight 46 as seen in FIG. 5 and is biased in that position by a spring 56 secured between a projection 54a' on the end of lever 54 and an arm 55a of the lever 55.

Attraction of the armature bracket 54 to the solenoid 53, when the latter is energized, withdraws the operating lever 55 downwardly so as o permit falling action of the weight 46; causes a downward movement of arm 40 and connecting rod 41 for idle movement of the ratchet pawl 38 connected with the feed rollers; and causes a downward stroke of arm 12a to actuate the printing head 12 to press the tape 18a against the type 11a. Upon release of the solenoid 53, means is provided for returning all of the parts operated thereby in the opposite direction. This comprises an arm 58 pinned to shaft 14 and biased upwardly as shown in FIGS. 1 and 6 by a spring 59 which is adjustably mounted at its upper end in a bracket 60 secured to the base plate 13.

The operation of the device should now be clear. When the ring 10 of the scale device comes to rest in a weighing operation, means not shown is provided to supply electrical current to the connections 53a for the solenoid 53 so as to energize the same. This attracts the L-shape bracket 54 to the solenoid 53 from the position shown in FIG. 5 which causes three motions: (1) arm 12a moves downwardly as viewed in FIG. 2 carrying the printing head 12 downwardly to contact the tape 18a with a row of type 11a on ring 10 which represents the weight which has just been mesaured; (2) connecting rod 41 is drawn downwardly by arm 40 to cause an idle movement of ratchet pawl 38; (3) operating lever 55 is pulled downwardly by the bracket arm 54 to permit weight 46 to fall downwardly as viewed in FIG. 1 which drives the ratchet wheel 45 and take-up reel 33 in the direction of the arrow of FIG. 1. This takes up the loose tape fed on the preceding operation by the rollers 25 and 26. Weight 46 is so chosen and connected that it will take up the loose tape 18b, 18c, but will not pull the tape 18b through the feed rollers 25 and 26. Upon completion of the printing operation just described, the solenoid 53 is deenergized whereupon the spring 59 acting through arm 58 causes three motions: (1) arm 12a and printing head 12 are raised; (2) connecting rod 41 is raised by arm 40 causing a driving stroke of lever 36 and pawl 38 and driving the feed roller 26 in the direction of the arrow of FIG. 1 causing a feeding action of tape portion 18b between the feed rollers; (3) operating lever 55 lifts weight 46 into operative position for its next stroke. This movement of lever 55 is limited by the member 54a on lever 54 striking the adjustable stop 61.

What is claimed is:

1. In a recording weighing scale having a type wheel positioned responsive to a weighing operation, having a blank tape storage reel and having a printing head for pressing said tape against said wheel to make a weight record, the combination of a base, tape feed rolls mounted on said base beyond said printing head, a printed tape take-up reel mounted on said base beyond said feed rolls, a drive means for driving said feed rolls including a ratchet moving in one direction to feed tape and in a reverse idle direction, a drive weight movably on said base for falling and rising movement, a driving connection between said weight and said take-up reel including a ratchet driving said last named reel in tape take-up direction by falling movement of said weight and said ratchet idly returned in the opposite direction by rising movement of said weight, an actuating means on said base having a drive stroke and a return stroke, actuating connections between said means on the one hand and said printing head and said feed roll drive means and said drive weight on the other hand to cause, on said drive stroke, printing action of said printing head and reverse idle action of said feed roll drive means and falling movement of said drive weight, and to cause, on said return stroke, reverse action of said printing head and tape feeding movement of said feed rolls and rising movement of said drive weight.

References Cited

UNITED STATES PATENTS

| 691,252 | 1/1902 | Dyson | 346—79 X |
| 1,880,314 | 10/1932 | Cook | 177—9 |

ROBERT S. WARD, JR., Primary Examiner

GEORGE H. MILLER, Assistant Examiner

U.S. Cl. X.R.

346—79